US006338023B1

(12) United States Patent
Bourgeois et al.

(10) Patent No.: US 6,338,023 B1
(45) Date of Patent: Jan. 8, 2002

(54) AUTONOMOUS SURVEY SYSTEM (AUTO SURVEY)

(75) Inventors: Brian S. Bourgeois, Slidell; Andrew B. Martinez, New Orleans; Peter J. Alleman, Youngsville; Jami J. Cheramie; John M. Gravley, both of Lafayette, all of LA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/476,332

(22) Filed: Jan. 3, 2000

(51) Int. Cl.$^7$ ............................................... G06F 19/00
(52) U.S. Cl. ......................................... 702/5; 702/150
(58) Field of Search ................................ 702/5, 2, 150; 701/50; 367/15, 73, 88; 56/10.2 A; 180/168, 169

(56) References Cited

U.S. PATENT DOCUMENTS

| | | | | | |
|---|---|---|---|---|---|
| 4,924,448 | A | * | 5/1990 | Gaer .......................... | 367/88 |
| 5,438,817 | A | * | 8/1995 | Nakamura ............... | 56/10.2 A |
| 5,646,844 | A | * | 7/1997 | Gudat et al. .................. | 701/50 |
| 5,682,357 | A | * | 10/1997 | Rigsby ........................ | 367/15 |
| 5,878,371 | A | * | 3/1999 | Hale et al. ...................... | 702/5 |
| 5,987,383 | A | * | 11/1999 | Keller et al. .................. | 701/50 |
| 6,082,466 | A | * | 7/2000 | Gudat ........................... | 172/5 |

OTHER PUBLICATIONS

Bourgeios et al. Autonomous Bathymetry Survey System; IEEE J. Oceanic ENOR; vol. 24, No. 4, Oct. 1999, p. 414–442.

Bourgeios et al.; Autonomous Bathymetric Surveying; Proc. 10$^{th}$ Intl. Symp. On Unmanned Untethered Submersible Tech.; Sep. 1, 1997 Autonomous Undersea Systems Inst... pp. 1–77, Sep. 1997.

* cited by examiner

Primary Examiner—Donald E. McElheny, Jr.
(74) Attorney, Agent, or Firm—John J. Karasek; Charles J. Stockstill

(57) ABSTRACT

The autonomous survey system (AutoSurvey) is used to automatically maximize area coverage with swath sensors and to minimize survey time while ensuring the collected data meets specified quality constraints. The autonomous survey system (AutoSurvey) evaluates the effects of the environment and system performance on the collected survey data by modulizing the data collection into a series of modules—data collection and error detection, data georectification, data quality validation, swath-edge fit, next-line way point generation, and the autopilot. All of these processes are implemented in near real-time, allowing unfettered survey progress. The data is applied directly between processes, providing operator independent system operation; the autosurvey system directly controls the survey vessel via the autopilot. Through the real-time data acquisition the system provides automation of the operator quality and coverage assessment tasks and also provides quantified data assessment. The operator is able to adjust the system operating parameters to compensate for ambient conditions and to determine subsequent navigation way points as a function of the specified survey criteria.

27 Claims, 10 Drawing Sheets

AUTONOMOUS SURVEY SYSTEM (AUTO SURVEY)

BACKGROUND OF THE INVENTION

1. Field of the Invention

This invention pertains generally to the efficient employment of a swath survey system and more particularly a swath survey system wherein the swath surveys are automated.

2. Description of the Related Art

The traditional goal when surveying an ocean bottom has been primarily to provide the mariner with the data needed to ensure safety of ship navigation. Bottom contours and sparse selected soundings are generally sufficient to meet this need. However, with increasing demands on the accuracy of hydrographic surveys and accelerating commercial exploitation of the sea floor, data is desired that will provide more than a general characterization of the sea floor. Modern requirements demand 100% coverage, i.e., coverage that provides a dense set of soundings suitable for generation of a gapless topographic representation of the sea floor.

Modern hydrographic sounding systems are capable of meeting this need, but the environment significantly impacts their performance. Because of the complexity of the environmental effects, in-situ assessment of system performance is required to ensure 100% coverage.

For many decades surveys have been primarily conducted using vertical single-beam sonar systems. Since it is impractical to achieve 100% coverage with these systems, surveys are conducted using a series of preplanned lines that are based on typically scant historical knowledge of an area's depth contours. Acoustic imaging systems are used to ensure that shallower areas do not exist between the sounding lines. These imaging systems provide wide area bottom coverage but do not yield sufficiently accurate depth soundings for charting purposes, and the generated images typically require human interpretation. When questionable areas are found in the imagery, the single-beam system is deployed over the area for accurate soundings.

In contrast, modern swath systems use multibeam sonar technology. These systems provide multiple soundings with each sonar ping that are located within a wide swath perpendicular to a ship's track. When properly compensated, all of the soundings generated can achieve the required accuracy needed for charting and other purposes. As compared with single-beam systems, swath systems can provide 100% bottom coverage, yielding denser soundings and faster coverage of the area. Even though swath system hardware cost is much higher than single-beam, the ability to achieve rapid total bottom coverage allows these systems to be more cost effective for charting.

Swath systems can provide superior performance, achieved through significant added complexity in the survey system and its operation. The effective sea floor coverage and accuracy of a swath system is principally affected by several factors: ocean depth, positioning errors, ray bending, and bottom type and morphology.

Swath systems are typically operated at or near the ocean surface in order to maximize bottom coverage with time. Since a swath sonar covers an angular sector (as larger as 150 degrees for some commercially available systems) the actual swath width on the ocean floor varies with ocean depth—narrower in shallow water and wider in deep water.

Swath sonar systems provide range as a function of angle with respect to the sonar head. To generate soundings from this data accurate measurements of sensor pitch, roll, heading, heave, and position (vertical and horizontal) are required. The affect of pitch, roll and heading errors are most severe in the outer beams of the system due to the greater slant range. The result of such errors is to reduce the usable systems swath width.

Sea state and sea direction can adversely affect system performance. Rough seas can exceed the capability of the pitch, roll, heading, and heave sensors to correctly compensate the sonar data. Consequently, sea direction becomes significant since the vessel will handle differently depending on its heading relative to the seas. High sea states can also result in aeration of the water under the sonar head which can drastically reduce effective range and swath width, and this effect will vary with time and heading.

The sound velocity structure of the water column affects the direction sound travels through the water, resulting in ray bending. The consequences of this for a swath system is uncertainty in the proper location of the bottom, particularly in the outermost beams.

Bottom composition affects the return strength of the sonar pulse and thus the effective range and swath width of the system.

Bottom morphology can have several affects on swath system performance. Sand waves can result in destructive interference of the acoustic signals. Proud bottom features can mask low-lying areas. Excessive slope can affect the ability of the system to track the bottom and affects return signal strength.

The significant consequence of these combined factors is that it is difficult to predict a-priori the effective swath width of a multibeam sonar, making it impractical to pre-plan survey lines to achieve minimum survey time while ensuring complete bottom coverage. Consider a particularly simple case, where a series of parallel lines are to be run over an area with a slope, and the lines are oriented perpendicular to the contour of the slope. This might be necessary due to weather or sea state. If planned line spacing is computed using the average depth and the nominal swath width, the result will be excessive overlap between swaths in the deep areas (wasted survey time) and gaps between swaths in the shallow areas (missing data). The missing data are called "holidays" and the areas of excessive overlap are called "overages."

Therefore, it is evident that the current techniques have has two fundamental drawbacks; first, the swath system performance, in terms of swath coverage width, is significantly affected unpredictable environmental conditions, and second, parallel survey lines will result in data gaps (holidays) and overages (excessive coverage) in areas where the ocean floor has significant morphology. Holidays result in loss of data and overages result in wasted survey time.

In a normal survey practice data is collected and the achieved data quality and coverage is analyzed after completion of the survey. Existence of holidays and overages, considering only quality data (data that meets some defined quality constraint), are not apparent until after the survey is completed. At this point the time loss due to overages cannot be recovered, and the survey vessel must be re-deployed to recover the data over the gaps.

SUMMARY OF THE INVENTION

The object of this invention is to achieve 100% survey coverage with survey data of acceptable quality in minimum time.

Another objective of the invention is reduced human operator requirements.

Another objective is to provide a simulation capability that will allow prediction of system performance over an area given pre-existing data.

These and other objectives are achieved in the autonomous survey system (AutoSurvey) by evaluating the effects of the environment and system performance on the collected data. The AutoSurvey system accomplishes this by modulizing the data collection into a series of modules —data collection and error detection, data georectification, data quality validation, swath-edge fit, next-line way point generation, and the autopilot. All of these processes are implemented in near real-time, allowing unfettered survey progress. The data is applied directly between processes, providing operator independent system operation; the AutoSurvey system directly controls the survey vessel via the autopilot. Through the real-time data acquisition the system provides automation of the operator quality and coverage assessment tasks and also provides quantified data. The operator is able to adjust the system operating parameters to compensate for ambient conditions and to determine subsequent navigation way points as a function of the specified survey criteria.

DESCRIPTION OF THE PREFERRED EMBODIMENT

Figure 1:
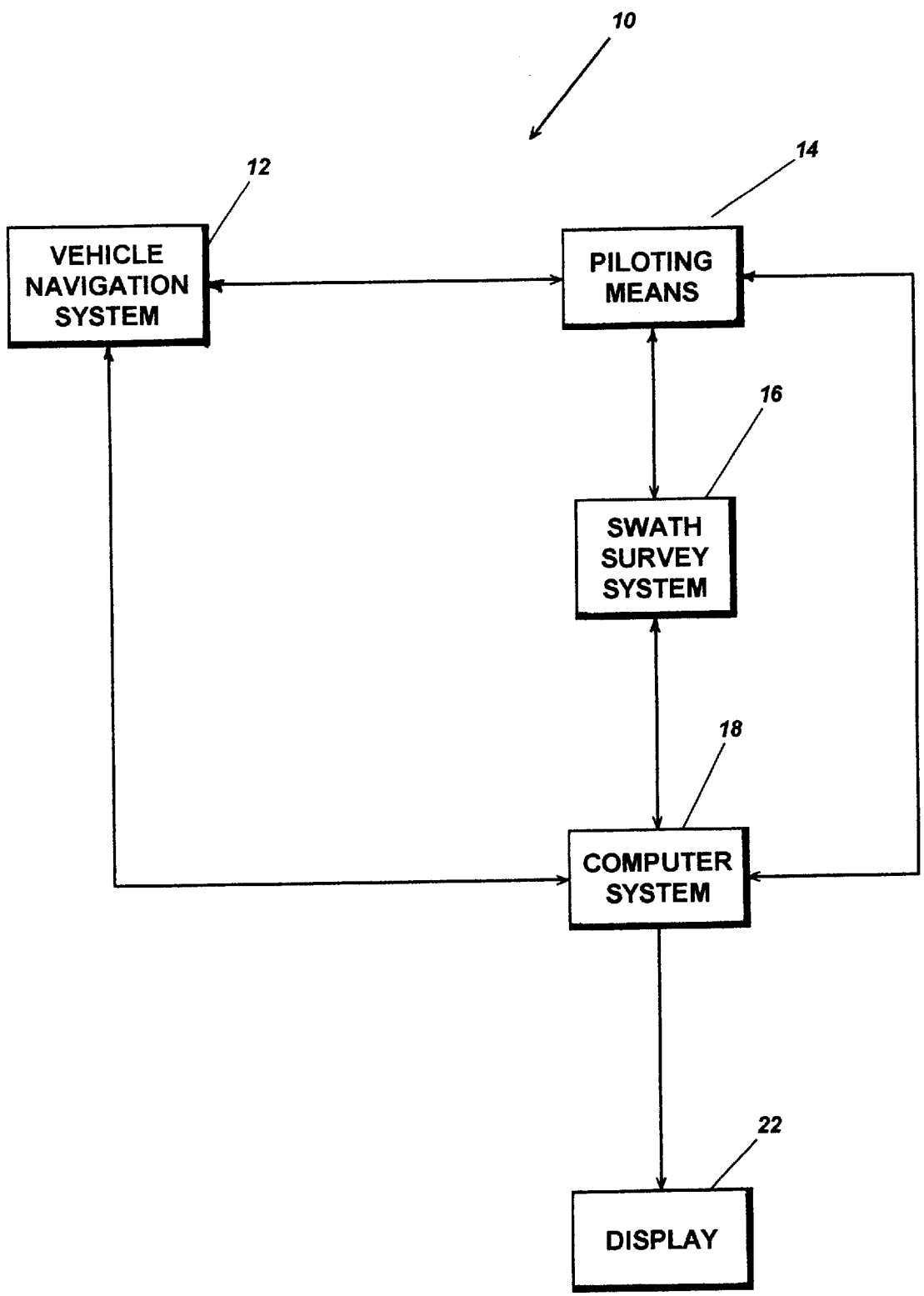
FIG. 1 shows a block diagram of the autosurvey system.

The autosurvey system 10, as shown in FIG. 1, is basically comprised of a navigation system 12 for the vehicle, a means of piloting the vehicle 14, a swath survey system 16, a computer system 18, and a display 22 of the data obtained. The navigation system 12 may be any type acceptable for steering a vehicle along a predetermined course, generally an electronic navigation system, such as a global positioning system satellite grouping or an inertial navigation system; the means for piloting the vehicle 14 may be either an autopilot system or manually. The swath survey system 16, is preferably, a swath sonar system, however, swath laser ranging or swath radar ranging may be used. The computer system 18 can be any type with sufficient processing power to handle the data input to the system and process it efficiently so as to be displayed on display 22 being either a standard color monitor and/or x-y plotter.

Figure 2A:
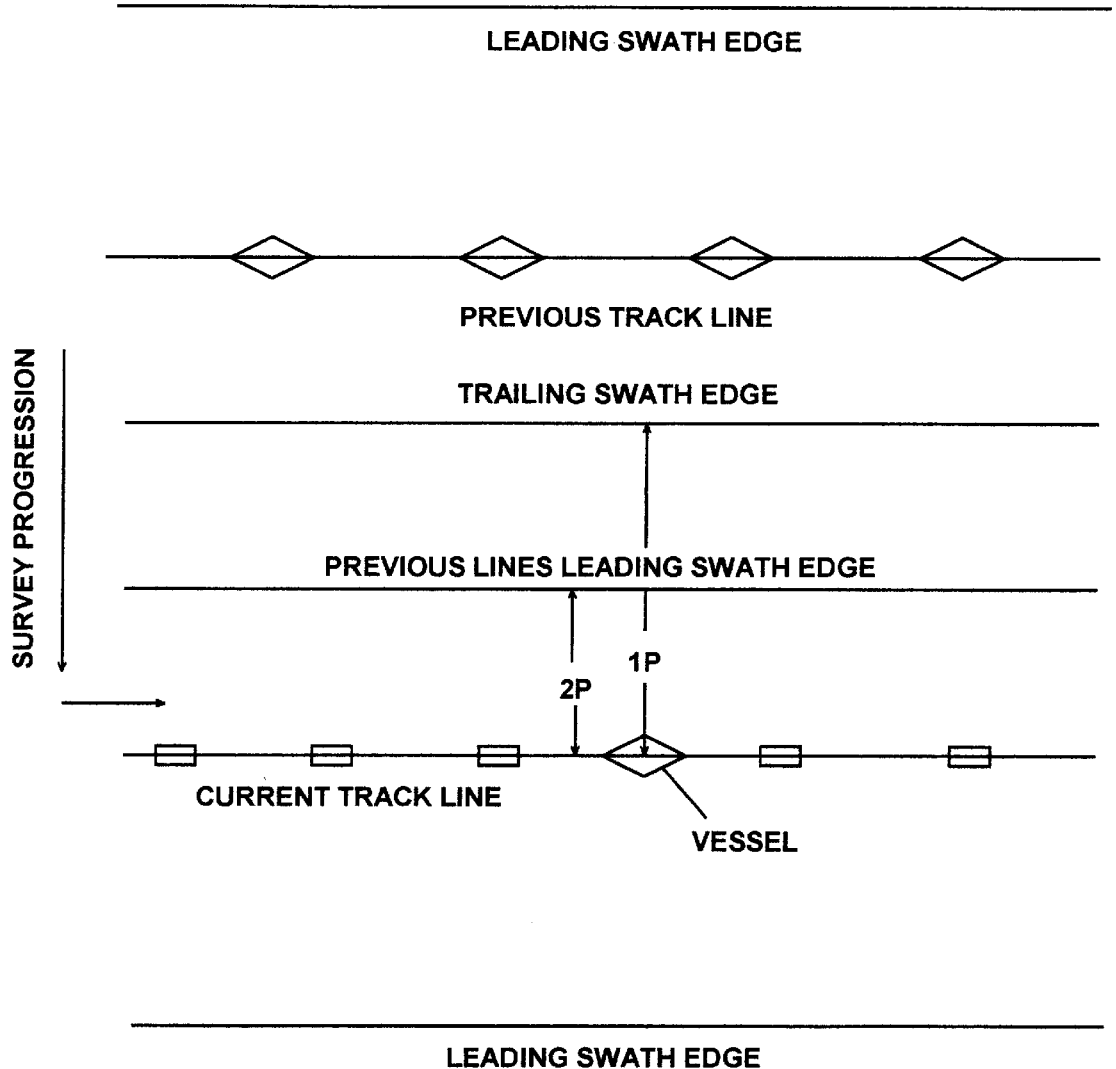
FIG. 2a shows a typical survey area coverage.

The autosurvey system 10 provides automation of the operator quality and coverage assessment tasks and also provide quantified, vice empirical, measurements of these parameters. Consequently, the operator is freed from dedicated attention to system performance and way point generation, and is only required to infrequently evaluate survey progress. In addition to ensuring that the survey mission's goals are being adequately met, the real-time coverage map shown on the display 22 also provides the capability for the operator to observe unexpected features in real-time and to alter mission objectives accordingly. A typical survey path is shown in FIG. 2a to be described hereinafter.

The essential element of the autosurvey system is the algorithm resident in the computer. This algorithm is comprised of a data collection and error detection module, data georectification module, data quality validation module, swath-edge line module, and a next-line way point generation module. All of these processes are implemented in near real-time, allowing unfettered survey vehicle progress. The data is piped directly between processes, providing independent system operation by a direct control of the survey vehicle by the autosurvey system 10.

Data quality assessment is performed using both georectified and gridded data, primarily through self-consistency validation. Intra-swath validation is achieved by analyzing the variation of samples within a grid cell and by evaluation of along the track and across the track trends in the data. Where overlapping data exists between swaths, inter-swath data validation can also be performed. Data quality assessment is used for two specific functions, to ensure sufficient data is being collected that meets a predefined quality criterion, and to extract from the trimmed data the swath leading edge that will be used to generate the next navigation path or track line.

The design approach of the autosurvey system 10 is such that sufficient quality data must be collected in each swath for the automated survey to continue. Otherwise, the operator (or a supervisory program) must be alerted to evaluate and take action on the problem. In simple cases, such as moderate sized gaps within a swath, an operator alert would be issued but the survey would continue. For more extreme degradation, such as no-data collected in a line, an operator alert would be issued and the automated survey would be terminated. The no-data condition is in fact the normal termination method for an area survey, wherein the system halts the survey if no new data is collected within the defined survey boundary. This approach takes into account operator errors (such as forgetting to turn on the sonar system) and system failures that result in total loss of data. In either case, the survey vessel is put into a safe condition by terminating the survey. To determine actual coverage, data that does not meet the quality constraint is eliminated from the swath, both interior and along the edges. Given the remaining area, and correcting for interior gaps, the total swath extent and percentage coverage within the swath can be computed directly. Additionally, gaps between the current swath and the previous swath can be determined in a similar fashion. Analysis of the achieved coverage within the swath(s) is then utilized to determine if the survey will continue.

In the performance of multibeam bathymetry swath surveying, the best information for determining the next navigation path is from the previous navigation path's data. This is an entropological approach to surveying wherein each new swath provides innovations, i.e., new information, and represents the "best" knowledge of the area to be surveyed. This applies to swath width, bottom depth, bottom reflectivity, etc. For example, the best estimate of swath width over an area is twice the half-swath width from the preceding navigation path and the swath data in the direction of the survey progression, given that this navigation path is both spatially and temporally "close" to the next one.

Given that the first requirement is met, a sufficient quantity of quality data within the swath, the data required for next track line generation is then extracted. Utilizing only the trimmed data set (poor quality data removed), the points corresponding to the outer swath's edges are extracted and trimmed by the defined survey boundary. This produces a set of bathymetry points corresponding to the leading edge of the swath, considering only quality-constrained data. These points are then passed to the swath-edge line fit module.

With this processing method it is sufficient to note that dropouts in the data, or pings where no data is returned, will result in spatial gaps within the resulting swath-edge line. Dropouts could occur due to intermittent system faults or due to conditions where no sonar return is received, such as excessively deep waters (holes, cliffs) or areas with a soft bottom. The spatial gaps in the swath edge data are preferred over filling those gaps using the edge data from the previous swath. this is because it is not desirable for the system to repeatedly drive over the same dropout areas trying to acquire data and it is assumed that the dropout occurred because system capabilities have been exceeded. By allowing spatial gaps, the line fit module will effectively generate lines across the gapped area using points on either side of the gap. It is the function of the swath coverage algorithms to determine if the gaps are large enough to require corrective actions.

The straight line (SL) approach uses a series of straight parallel lines to cover the survey area, and adaptive spacing between adjacent survey lines is employed. The SL approach is very effective over areas that are reasonably flat and over areas with gradual slopes when the track lines are run collinear with the bottom contours. Advantages of the SL approach include a simple navigation track or path (particularly in high traffic areas), staying close to the point where the last sound velocity profile was taken, and ability to choose line orientation for minimal sea state effect on the vessel. The algorithm for the SL approach finds the best-fit line (least squares) to the previous lines' swath edge, with the constraint being that the fit must be parallel to the previous track line. This method provides the least flexibility in compensation of survey tracks for actual bottom morphology and is expected to produce gaps and areas of excessive swath overlap when traversing across bathymetry contours.

The linear regression (LR) approach uses a series of straight lines, without the constraint that the lines must be parallel. The LR approach offers the same advantages as the SL, but will typically provide more efficient coverage over areas with nominal depth variations since the track lines are approximately parallel to the previous swath's edge. Except in areas with extreme changes in depth, the LR lines will remain nearly collinear, offering simple navigation and the ability to choose vessel orientation with respect to the seas. The algorithm for the LR approach simply finds the least squares fit to the previous lines' swath edge.

The piecewise linear (PL) approach uses a series of line segments that approximate the shape of the previous lines swath edge. This method, as compared with SL and LR, provides a superior ability to improve survey efficiency in areas with rough bottoms. However, the PL approach can generate complex track lines that complicate vessel navigation, and preferred headings (for sea state reasons) cannot be readily adhered to. Implementation of the PL approach is significantly more complicated than the SL or LR approaches which only required a least squared error fit be done to a set of points. There is a multitude of techniques for fitting curves to an arbitrary set of points (polynomial, spline, etc.), but this application requires an unsupervised algorithm that is fast and robust. Consequently, a center-of-mass technique was chosen, which finds the spatial center of a sequence of swath edge points. While this algorithm does not provide a least square error solution, it essentially generates the path a human operator would choose and is computationally inexpensive. An adaptive PL method, where line segment length is adjusted according to the spatial variance of the local swath edge, handles the conflicting goals of smoothing transients and following sharp swath edge changes.

The box approach entails driving the boundary. With this technique, the first survey track line would be the survey area boundary. Subsequent track lines would then be generated by doing a best-fit to the interior swath's edge of the resulting data. The box method offers the potential of a more time-efficient approach in that all turns are executed within the survey boundary so data collection is not interrupted. To utilize the Box approach the sound velocity profile must be valid over the entire survey area, instead of just the local area of the current line. Also, sea-state must be low enough so that vessel track orientation is not a factor in survey system performance since multiple headings will be taken. The Box method algorithm also employs the center-of-mass technique.

The first survey track line is defined to be a survey boundary edge, or whole boundary for the Box approach. For the second and subsequent track lines, the next track line is generated by performing a shift, and is doing a fit to the previous lines' shifted swath edge data. The shift is required to properly position the fitted line (or line segments) to ensure a specified percent data coverage.

Referring to FIG. 2a, it is useful to relate the data coverage to the shift factor, but doing this requires formal definition of percentage coverage. Let $d_1$ be the distance from the vessel's location to the (trailing) edge of the swath. This is the half-swath distance. Also, $d_2$ is the distance from the vessel location to the edge of the previous swath's data. The value of $d_2$ is negative if it is in the opposite direction of $d_1$, that is if the vessel location is inside the previous data. Since the concern at this point is only the coverage at the trailing edge, a fictitious swath of width $2d_1$ is used in computations. The overlap between adjacent swaths at the leading edge is $(d_1-d_2)$. Using these quantities, the percent overlap between adjacent swaths, V, is defined as the overlap divided by the effective swath width.

$$V=(d_1-d_2)/2d_1 \quad (1)$$

and the percent coverage (C) is defined as:

$$C=1/(1-V) \quad (2)$$

The shift factor (S) is a function of C and is given by:

$$S=2/C \quad (3)$$

Figure 2B:
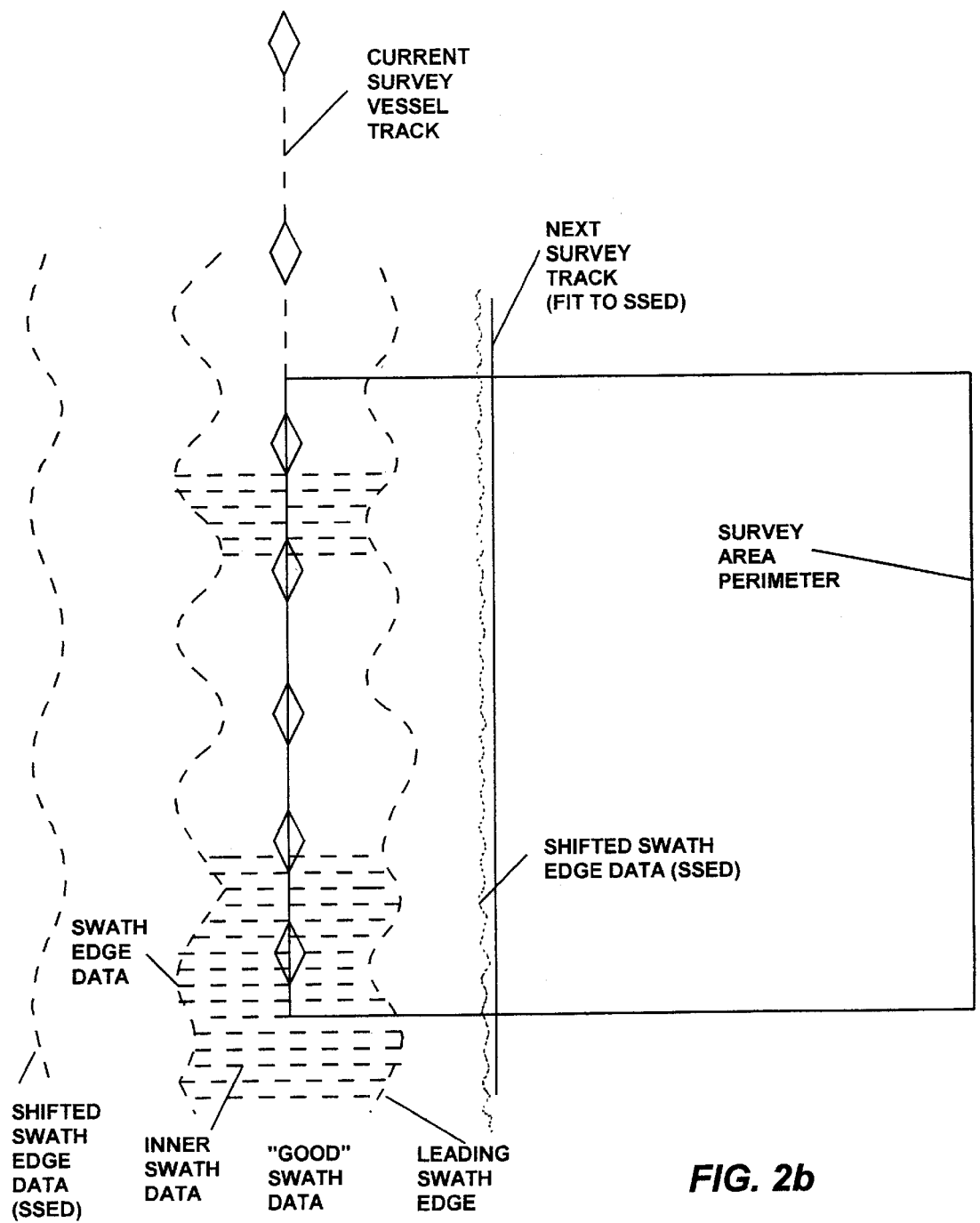
FIG. 2b shows the relation of data coverage to shift factor

Referring to both FIG. 2b and FIG. 1, the shift factor is applied to the distance between the current track line and the leading swath edge to determine the proper position of the next track line. This approach effectively shifts the resulting fit line or line segments by the average (or local average)

width of the previous swath. Typically, the specification would be for 100% coverage with data meeting the quality constraint. In this case, the edges of each adjacent swath, after bad data is trimmed, would butt up against each other seamlessly. Greater than 100% coverage is often specified since some swath-to-swath overlap is desired to allow for inter-swath data validation, and gaps could occur here the swath edges are poorly fit. The autosurvey system 10 provides for operator specified desired coverage up to 200%, where the next track line would be the current track line's swath edge. Less than 100% coverage can also be specified for situations where it is determined that gaps between swaths are allowable, such as a quick-look survey of a region. In the case of a quick-look survey it is likely that either the SL or LR fit approaches would be used. In the simplest implementation, the shifted lines are clipped by the survey boundary and a series of evenly spaced way points are generated along the line using the equation for the line. For PL and Box processes, the segmented line is clipped by the survey boundary and the set of vertices that connect the line segments are used as the way points. These way points are then passed to the vessel autopilot 14 for execution. With the current implementation, autosurvey 10 processes the previous track line's data and generates the next track line way points within a few seconds after crossing the survey boundaries' edge. The autopilot 14 is designed to halt the vessel in the event that insufficient valid data is collected and next-line way points cannot be generated.

For all of the line fit approaches, the root-mean-squared (RMS) error for the fit is computed. The RMS error has a direct relationship to the actual percent coverage that will be achieved assuming the vessel steers the generated track line, and that the next lines' swath width is the same as the previous line.

Assuming Gaussian errors in the line fit, it is straight forward to compute the expected area missed between swaths. The overlap $d_1-d_2$ is a random variable; let its mean value be d, the expected overlap between swaths. If the line fit to the swath edges are assumed to have Gaussian errors with standard deviation, $\sigma$, equal to the RMS error of the fit, then the overlap is also Gaussian with the mean d and variance $2\sigma^2$. Data missed at the outer edge of each ping is represented by its length $\delta$ which is zero when overlap is greater than zero and equal to the negative of the overlap otherwise.

$$\delta = \begin{matrix} 0 & d_1 - d_2 > 0 \\ d_2 - d_1 & \text{otherwise} \end{matrix} \quad (4)$$

When adjacent swaths overlap, $\delta=0$. When gaps occur, $\delta>0$ and it is distributed as the tail of a Gaussion with mean $-d$ and variance $2\sigma^2$. The expected distance missed per ping is thus $$E\delta = \int_0^\infty \frac{\delta}{2\sigma\sqrt{\pi}} \exp\left(\frac{(\delta+d)^2}{4\sigma^2}\right) d\delta \quad (5)$$

$$= \frac{\sigma}{\sqrt{\pi}} \exp\left(\frac{-d^2}{4\sigma^2}\right) - d\Phi\left(\frac{-d}{\sqrt{2}\sigma}\right)$$

where $\Phi(\cdot)$ is the standard normal cumulative distribution function (cdf). The expected area missed is the distance traveled times the expected length missed per ping. For example, for a shift factor of S=2 (resulting in a nominal coverage of 100% and a value of d=0), the area missed is $\sigma/\sqrt{\pi}$ times the distance traveled,. Using Eq. (5), the shift factor can thus be scaled to compensate for a lower percentage coverage resulting from a poor fit. The RMS error can also be used to execute a tiered approach to the type of line fit used. With a tiered approach, the line fit process would start with the SL algorithm for every line. If the RMS error were too great, indicating possible gaps or excessive overlap, then LR and PL algorithms in turn would be attempted until a satisfactory error is obtained.

With more advanced implementations, the shift factor can be used to compensate for predicted environmental effects such as bottom slope and signal strength. If a consistent across-swath slope is observed, then the shift factor can be adjusted to compensate for the projected swath width by altering the position of the next navigation path. This would be utilized only when an up-slope is observed, since the swath will become narrower and gapping could occur. On a down-slope the swath would be broader and will not result in gapping. If the return signal strength is observed to be decreasing to a critical point (particularly in the outer beams) the shift factor can likewise be used to bring the next navigation path closer, compensating for the predicted reduction in the next navigation path's swath width.

Figure 3:
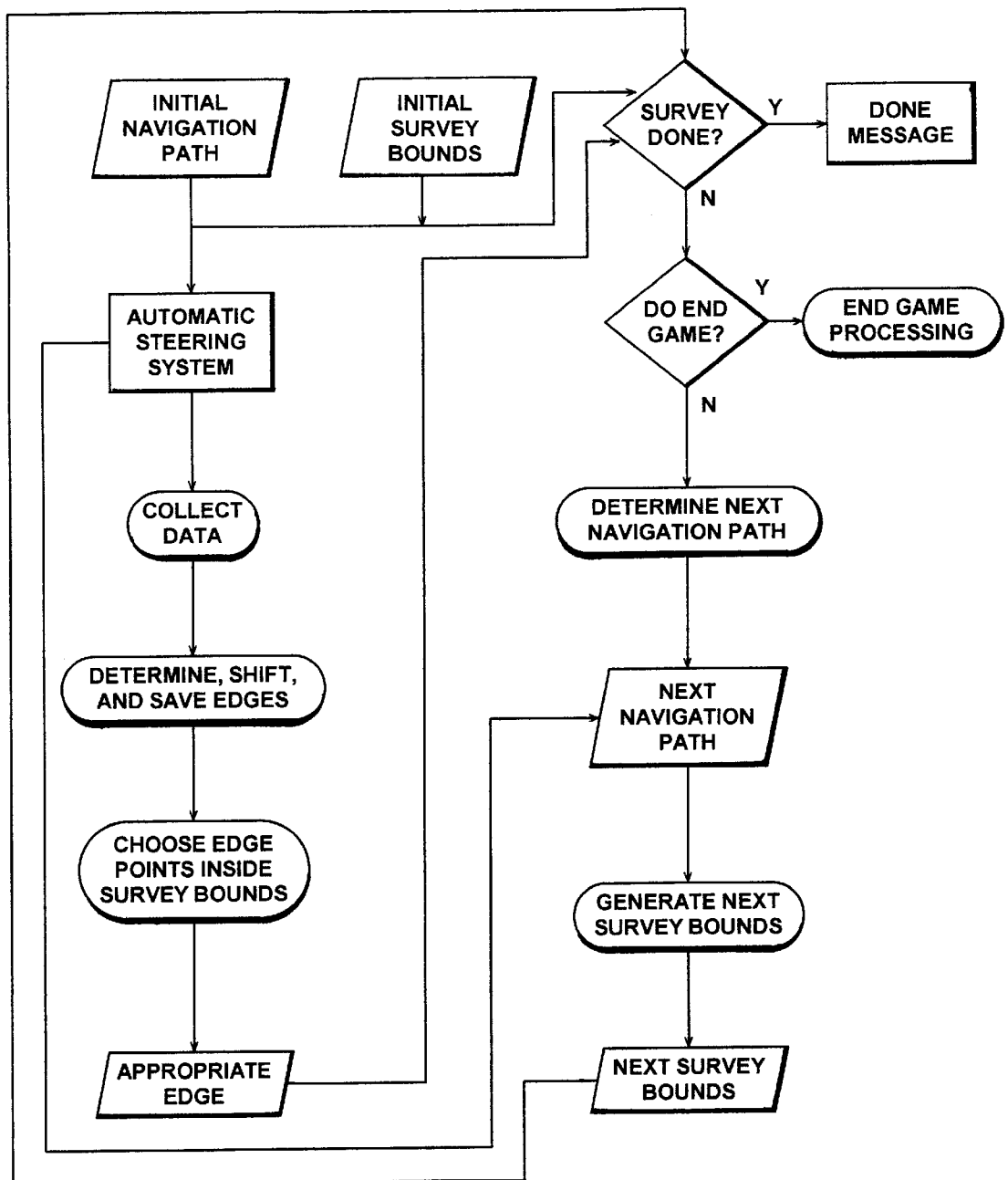
FIG. 3 shows a flow chart depicting the autosurvey processing overview

The autosurvey process, as shown in FIG. 3, is accomplished through preferably a software system called Hydromap, however any comparable system may be used. Hydromap was developed for the data collection, georectification and quality modules and is a software system for multibeam bathymetry surveying that provides functions of sensor control, data logging, real-time data processing and georectification, geographic display of processed data, raw data and vehicle position, and manual way point generation and line following. The data collection, error detection and georectification modules within Hydromap perform the following functions (a) Acquisition and storage of raw sensor data from the bathymetric sonar, position (vertical and horizontal), heading, attitude and surface sound velocity systems.

(b) Low-level rejection of invalid data due to detected errors in any of the individual sensors.

(c) Georectification of sonar data using the supporting sensor systems, sound velocity profile and tides, and (d) Gridding of the data into uniform cells Real-time acquisition, low-level data validation, georectification, and gridding of the data are prerequisite to the generation of a full-area presentation of the data collected, vice individual; swath or waterfall display. Waterfall displays do not georectify the data so it is difficult to assess intra-swath data consistency unless the vehicle motion is small and the vessel is traveling in a straight line. Individual georectified swath displays allows intra-swath data assessment, but not intra-swath. Hydramap performs both georectification and gridding and provides a real-time coverage map that displays the collected data for the entire area being surveyed, showing previous and current line data. A human operator uses the coverage map display to empirically assess the quality of the collected data and to determine actual, vice predicted, coverage of the sensor system. This allows the operator to adjust the system operating parameters to compensate for ambient conditions and to determine subsequent navigation way points as a function of the specified survey criteria.

Figure 4:
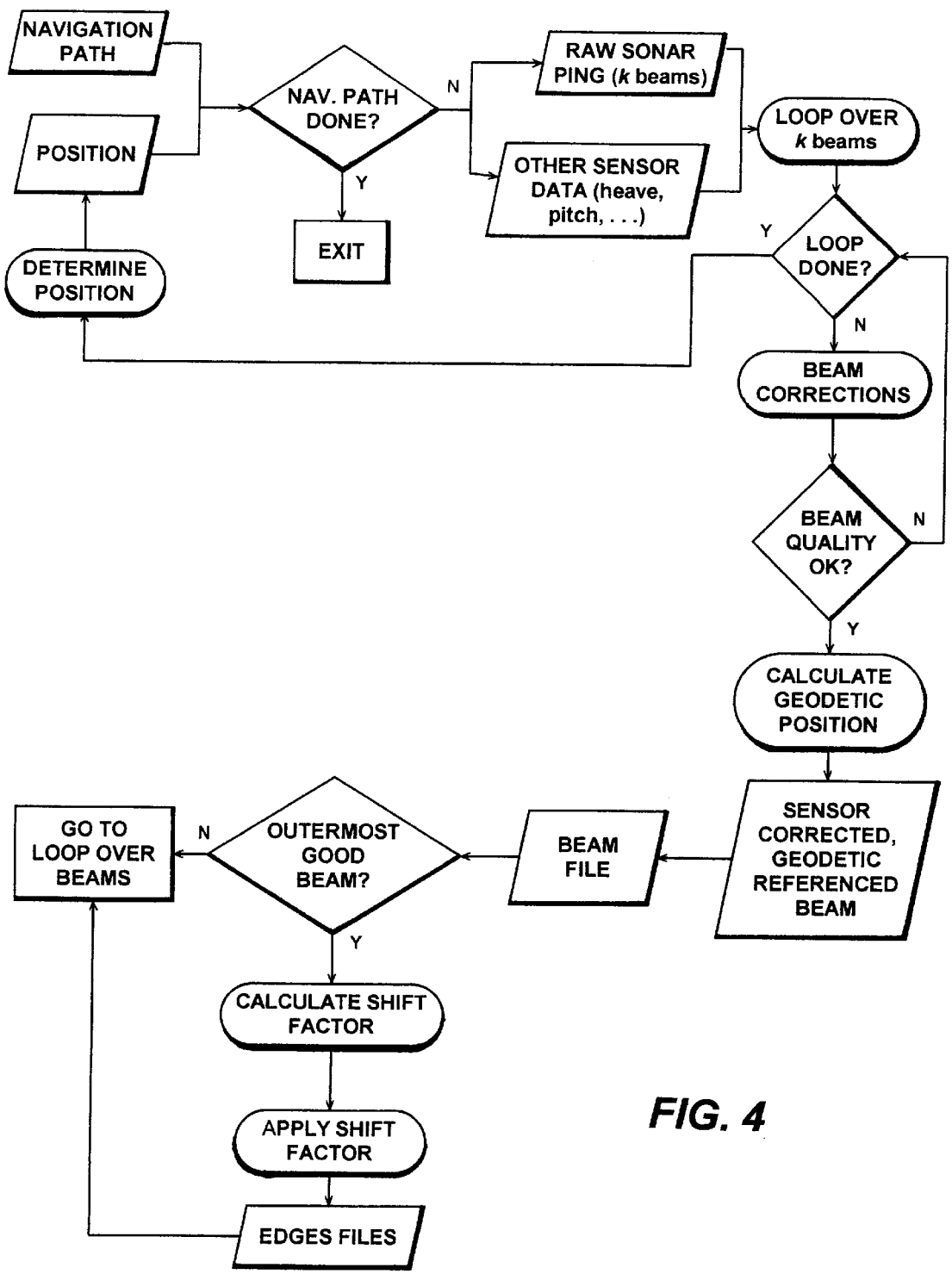
FIG. 4 shows a flow chart of the data collection and correction process, along with the edge determination process.

An overview of the data collection and edge detection processing is shown in FIG. 4.

The current data swath is composed of "pings" of sensor data, preferably sonar as in this case, presented to the system in a time ordered manner. Each beam within each ping is subjected to various corrections and/or rejections based upon the inputs from a number of other sensors (heave, pitch, roll, etc.). each beam is then analyzed by a number of quality filters. Beams passing these quality checks are then geodetically referenced. The two outermost of these good beams from each ping (assuming the entire ping has not been rejected) are kept as a portion of the edges of the current data swath. The fact that some pings or beams are rejected due to quality checks leaves "gaps" in the edges. The algorithms that determine the next navigation path to run tend to bridge these gaps left in the edge due to either poor quality data or nonexistent data.

Figure 5:
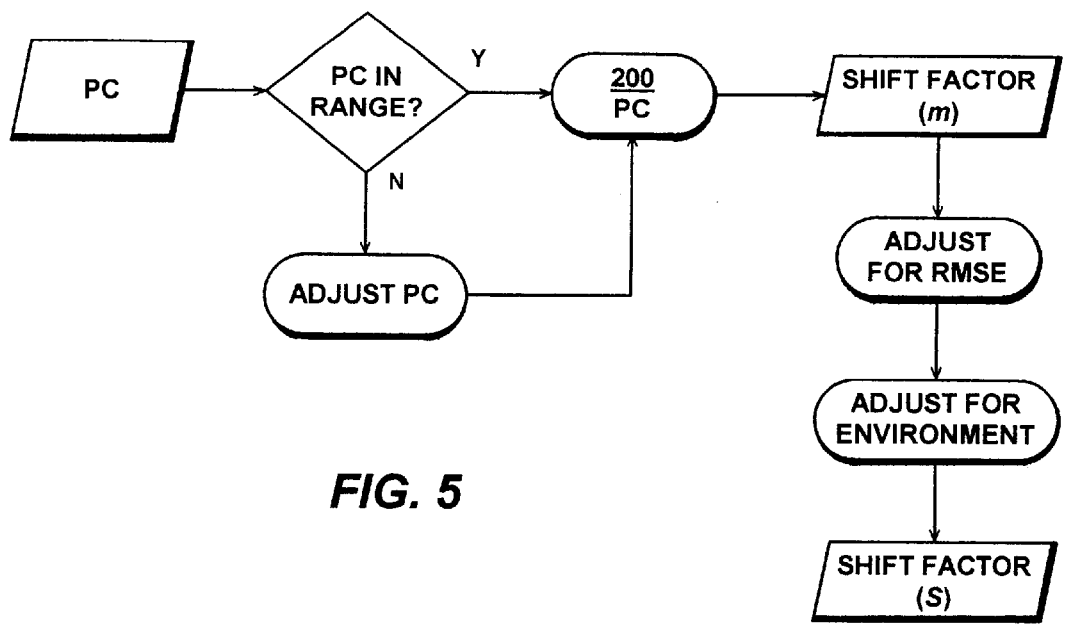
FIG. 5 shows a flow chart for the calculation of shift factor.

FIG. 5 shows the shift factor computation process.

Percent coverage (PC) is defined as:

$$PC = 100\left(\frac{100}{100 - PO}\right) \quad (6)$$

Percent overlap (PO) of adjacent swaths is defined as:

$$PO = 100\left(\frac{overlap}{swathwidth}\right) \quad (7)$$
$$= 100\left(\frac{d_1 - d_2}{2d_1}\right)$$

where $d_1$ is the distance from the vessel location to the (trailing) edge of the swath, this is the half-swath distance; $d_2$ is the distance from the vessel location to the edge of the previous swath's data, $d_2$ is negative if it is in the opposite direction of $d_1$, i.e., if the vessel location is inside the previous data. See, Bourgeios et al., AUTONOMOUS BATHYMETRIC SURVEYING, Proc. 10$^{th}$ Intl. Symp. on Unmanned Untethered Submersible Tech. (UUST'97), Durham, N.H., pp. 1–11, September 97; and Bourgeois et al., AUTONOMOUS BATHYMETRY SURVEY SYSTEM, IEEE J. of Oceanic Engr., Vol 24, No. 4, pp. 414–423, October 99; which are hereby incorporated in total by reference. The total swath width is given by $2d_1$ and the overlap is given by $(d_1-d_2)$, $d_1$ and $d_2$ are used to compute the actual PO and PC achieved between swaths.

A coverage of 200% implies that the next navigation path will lie upon the edge of the collected data that is inside the survey bounds. Choosing a percent coverage other than 200% implies that the next navigation path must be shifted in an appropriate manner. Although it is conceivable to achieve more than 200% coverage, more than 200% is not allowed for pragmatic reasons, as this would imply more than two passes to achieve, and one of the design goals is speed. The shift factor calculation ensures a range of 10% to 200% coverage, inclusive.

The position of the next navigation path is determined by applying a spacing multiplier, m, to the navigation path fit through the current swath's edge. The spacing multiplier (shift factor), S, is used to adjust the across-track distances of the current swath's edges in relation to the current navigation path. This method of shifting to adjust for percent coverage is independent of any algorithm used to determine the navigation path through the current swath's edge.

PO and PC are also a function of S, and are given by:

$$PO = 100\left(\frac{2-S}{2}\right) \quad (8)$$

$$PC = 100\left(\frac{2}{S}\right) \quad (9)$$

Eqs. (8) and (9) are valid for $S \geq 0$. The following examples (flat bottom assumed) are provided for clarification:

For S=0 there is no shift; the next navigation path is the same as the current navigation path. This gives 100% overlap and infinite coverage since all subsequent navigation paths are the same.

For S=1 the next navigation path is over the line fit to the current swath's edge. This gives 50% overlap and 200% coverage.

For S=2 the edges of adjacent swaths are aligned. This gives 0% overlap and 100% coverage.

For S=4 every other swath is skipped. This gives an overlap of -100% and coverage of 50%.

For all of the line fit approaches, the root-mean-square-error (RMSE) for the fit is computed. The RMSE has a direct relationship to the actual percent coverage that will be achieved assuming the vessel steers the generated navigation path and that the next swath has the same width as the swath just analyzed. These computations of RMSE have been discussed above, refer to Eqs. (4) and (5) and accompanying text.

The edge that will be used to determine the next navigation path must be chosen from the two edges that are output in the edge detection phase. The desired edge is the current half-swath edge in the direction of the survey progression. This edge is determined by taking each data point in the edges file in conjunction with the survey bounds and applying a point-in-polygon algorithm in a manner known in the art.

This simple point-in-polygon approach eliminates the need for complicated and error-prone algorithms that attempt to decide in which "real" direction the survey is progressing. Note that this type of processing is not needed in previous attempts at automation, since the strict following of predetermined navigation paths does not rely upon data for guidance. The edge-choosing process is partially illustrated in FIG. 6.

For this application, the line fit algorithms must be sufficiently robust as to allow unsupervised work. Speed is important as well. It is also imperative that each line fitting algorithm produce a RSME to allow a subsequent unsupervised decision upon the adequacy of the new navigation path's fit to the data.

Following are three algorithms used to determine the navigation way points for the next pass through the survey area. All of these algorithms generate a navigation path "through" the edge chosen, as described above. An overview of the processing for all three algorithms is shown in FIG. 6.

Figure 6:
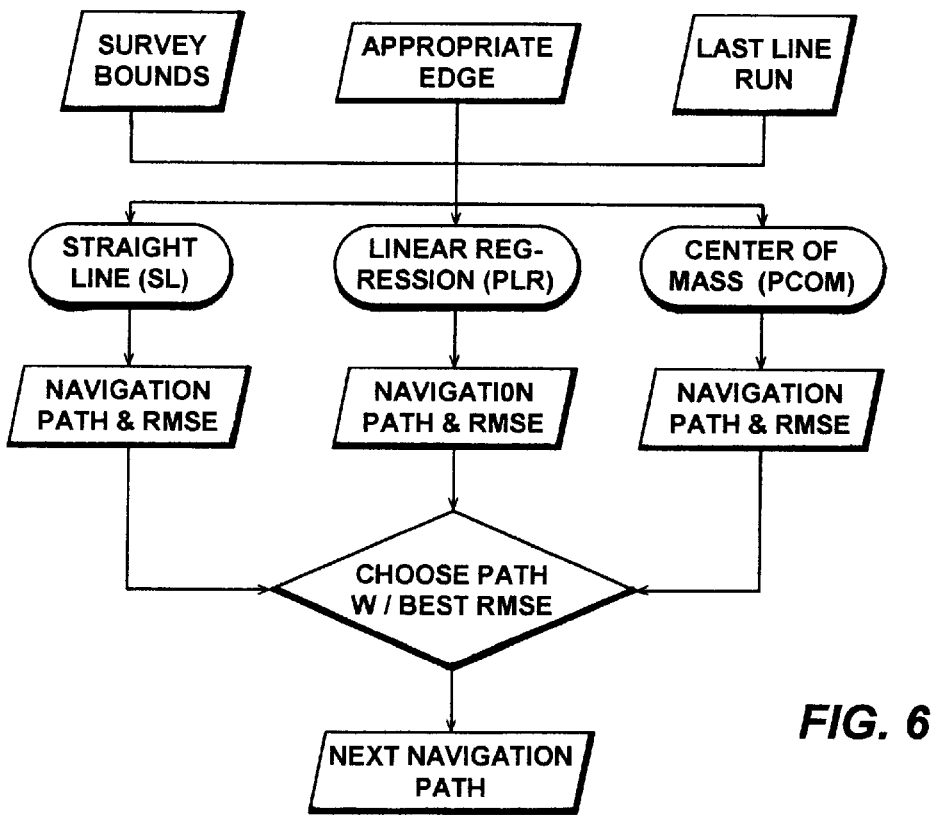
FIG. 6 shows a flow chart for the determination of next navigation path.

The straight line (SL) approach, shown in FIG. 6, generates a line parallel to the current navigation path. This method provides the least flexibility in compensating the navigation path for the actual bottom morphology, but is the simplest approach with respect to navigational safety since all navigation paths are parallel. This approach may result in periods of excessive overlap as well as periods of insufficient overlap when traversing across bathymetery contours. Excessive overlap results in wasted survey time and insufficient overlap can result in data holidays (gaps). The user may choose from two ways to specify the distance from the current navigation path to the next navigation path. The first choice, called minimum distance, calculates an average distance using the smallest ten percent (10%) of the perpendicular distances from the current navigation path to the current swath's edge. The second choice, called average distance, calculates an average of all perpendicular distances from the current navigation path to the current swath's edge. Choosing the minimum distance errs toward excessive overlap in order to ensure complete coverage. Choosing average distance may have areas of both excessive overlap and areas with no coverage.

Figure 7:
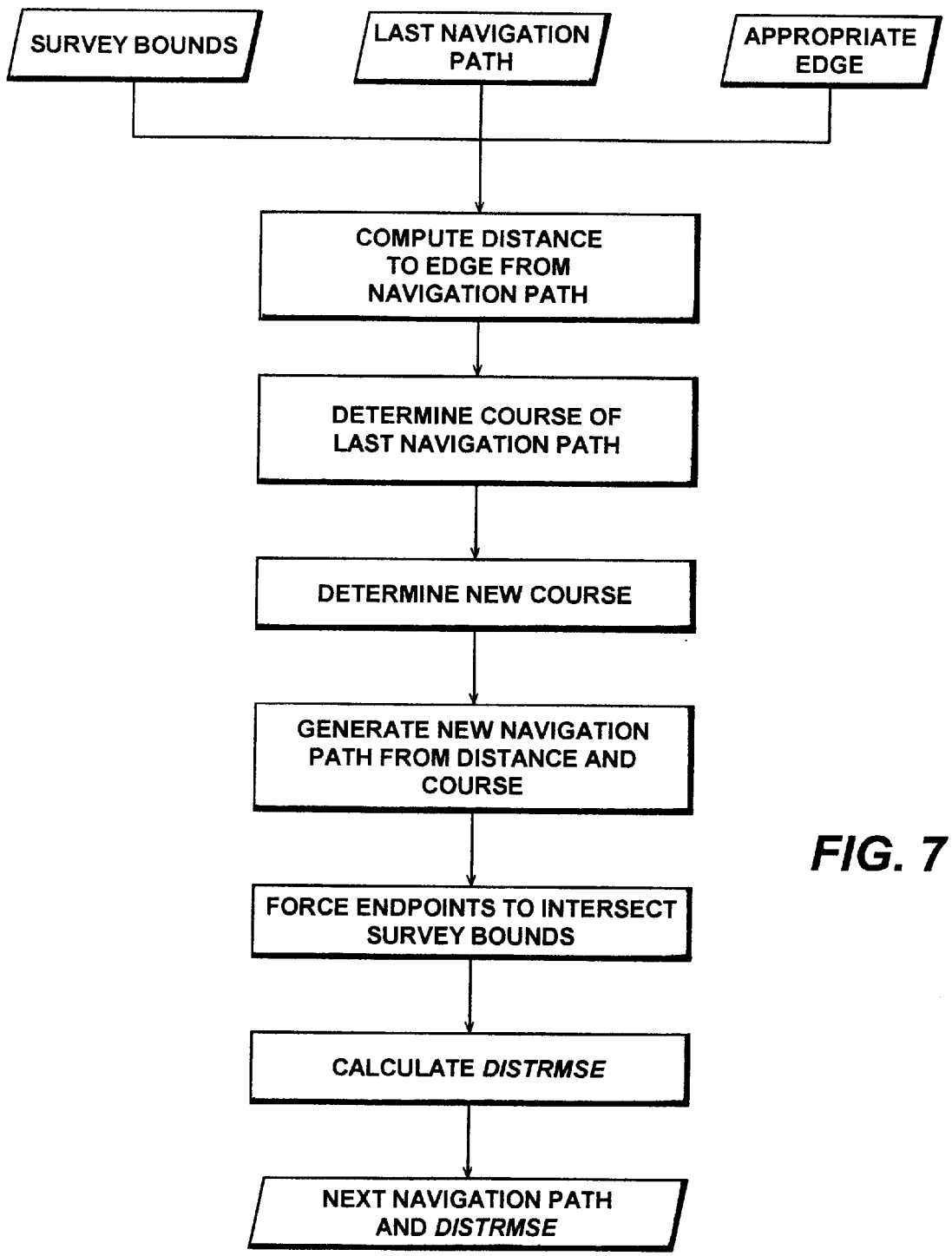
FIG. 7 shows a flow diagram for straight line (SL) calculation.

The algorithm for an adaptive parallel line fit first calculates the user-selected (minimum or average) distance from the last navigation path to the edge of the data swath. The approximate course direction pursued on the last navigation path is then determined, which the algorithm uses to determine the order of output of the way points for the next navigation path (as shown in FIG. 7 by the "Determine New Course" box). This information is then used to generate a new navigation path at the proper spacing toward the swath edge and parallel to the last navigation path. After the new navigation path is determined, each end point of the path is extended beyond the survey bounds and then the resultant line is clipped at the survey bounds to ensure that the final navigation path's endpoints lie upon the survey bounds. As the next to last step, a RSME is calculated by squaring the sum of the perpendicular distances from the swath edge to the new navigation path. Finally, the next navigation path and the DISTRMSE are output.

The algorithm for calculating the intersection of two lines is accomplished in a manner known in the art.

A common way of measuring how well a line fits a set of data points is to measure the distance from each point to the line and take the sum of all the distances divided by the number of data points as the error of the fit. It is also common to square the distance and sum, the squares of the distances. The latter is the method used here. The distance based RMSE is defined as:

$$DISTRMSE = \frac{1}{n}\sum_{i=1}^{n} \text{distance}(i, line)^2 \quad (10)$$

where line is a navigation path (SL) or a portion of a navigation path and n is the number of points.

Figure 8:
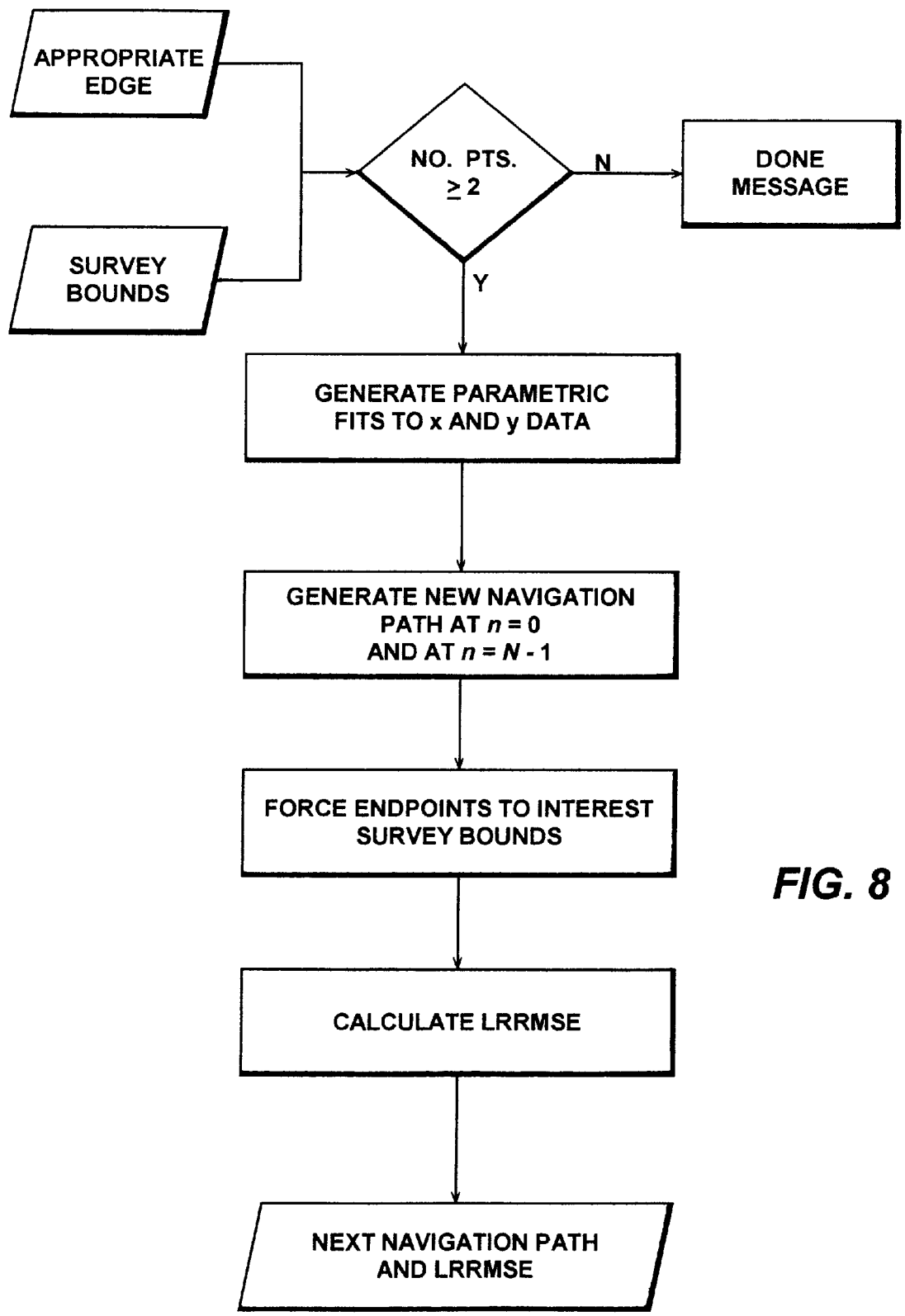
FIG. 8 shows a flow chart of the parametric linear regression (PLR) line computation.

The algorithm for computing a distance-based RMSE is:

INPUT:
  number of points
  array of points
  navigation path to test against
PROCESSING:
  for i=1 to number of points do
    calculate perpendicular distance from point i to test navigation path
    square it
    add it to the total distance
  end for
    divide total distance by number of points
OUTPUT:
  DISTRMSE The parametric linear regression (PLR) approach, an overview of which is shown in FIG. 8, finds the best line fit (parametric) to the edge of the current half-swath in the direction of the survey progression with no restrictions on its orientation by calculating a parametric linear regression of the x's and the y's, then utilizing this information to calculate the linear regression line for the data set. PLR also provides a simple navigation approach since all navigation paths are still straight lines.

A parametric first-order linear regression fit on a set of (x, y) data is given by the following:

$$x(n) = m_x n + b_x \quad (11)$$

-continued
for $n = 0, \ldots, N = 1$ $$y(n) = m_y n + b_y$$

N=number of points and $b_z$ and $m_x$ are defined as:

$$b_x = \frac{\left(\sum_{n=0}^{N-1} n^2 \sum_{n=0}^{N-1} x(n) - \sum_{n=0}^{N-1} n \sum_{n=0}^{N-1} nx(n)\right)}{\left(N\sum_{n=0}^{N-1} n^2 - \left(\sum_{n=0}^{N-1} n\right)^2\right)} \quad (12)$$

$$m_x = \frac{\left(N\sum_{n=0}^{N-1} nx(n) - \sum_{n=0}^{N-1} n \sum_{n=0}^{N-1} x(n)\right)}{\left(N\sum_{n=0}^{N-1} n^2 - \left(\sum_{n=0}^{N-1} n\right)^2\right)} \quad (13)$$

and $b_y$ and $m_y$ are defined similarly by substituting y for x in Eqs. (12) and (13).

Given the calculation in Eqs. (12) and (13), RSME for the linear regression (i.e., LRRMSE) is defined as:

$$\frac{1}{N}\left(\sum_{n=0}^{N-1} x(n)^2 - \left(m_x \sum_{n=0}^{N-1} nx(n) + b_x \sum_{n=0}^{N-1} x(n)\right) + \sum_{n=0}^{N-1} y(n)^2 - \left(m_y \sum_{n=0}^{N-1} ny(n) + b_y \sum_{n=0}^{N-1} y(n)\right)\right) \quad (14)$$

Given the calculations of $m_x n + b_x$ and $m_y n + b_y$ in Eq. (11), the calculations of the best fit linear regression line to the data is completed by solving for x(0), x(N−1), y(0), and y(N−1). The new navigation path represented by (x(0), y(0) and (x(N−1), y(N−1) is extended beyond the survey bounds and then the resultant line is clipped at the survey bounds to ensure that the final navigation path's endpoints lie upon the survey bounds. The algorithm for calculating the intersection point of two lines is accomplished in a manner known in the art. The final step in PLR is the calculation of the LRMMSE for line fit analysis and comparison against the other line fits methods.

Figure 9:
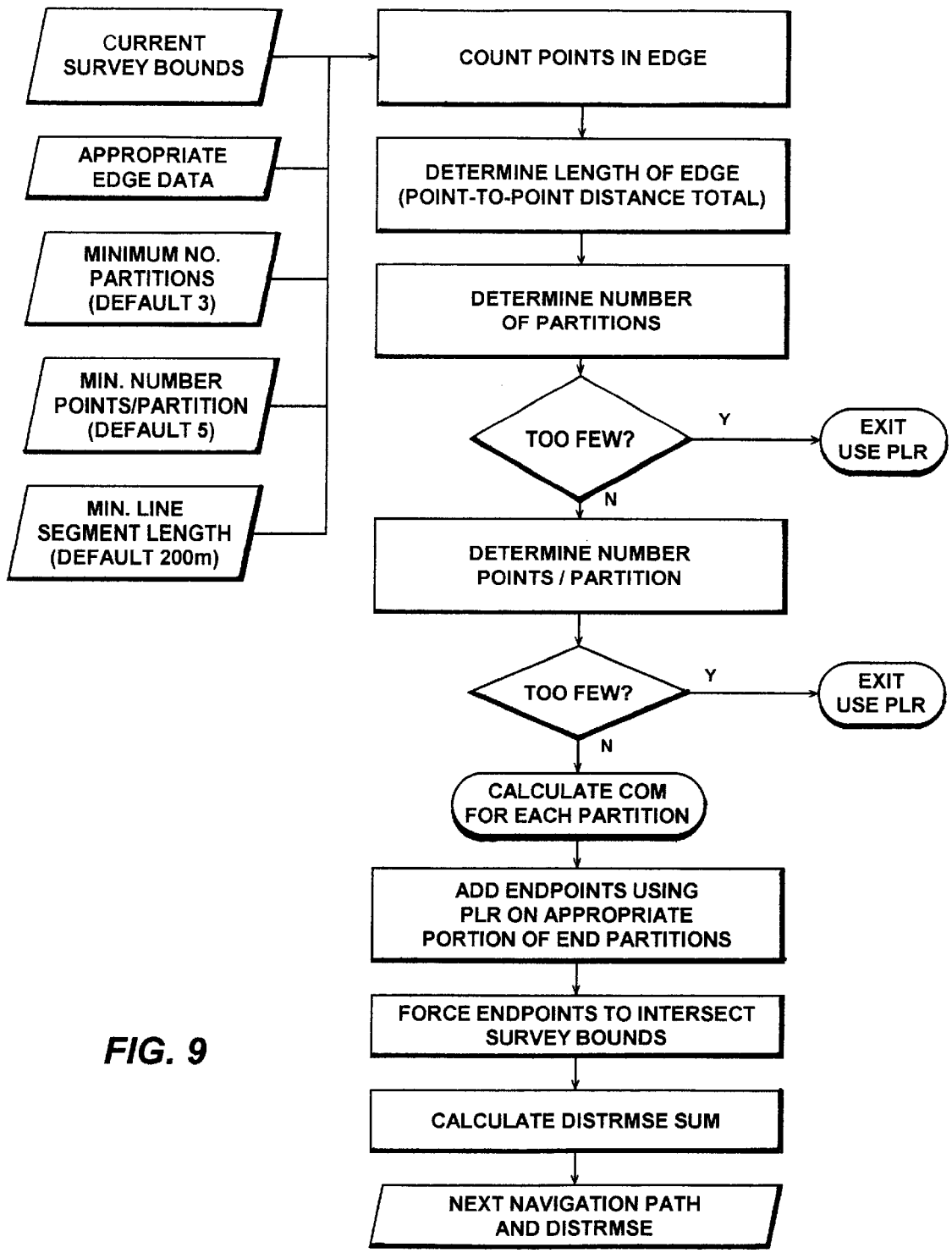
FIG. 9 shows a flow chart of the parametric center-of-masses (PCOM) line computation.

The parametric centers-of-mass (PCOM), shown in FIG. 9, approach provides a computationally inexpensive way to approximately follow the "curves" along the edge of a swath. This algorithm provides a way to model the general curve of the data while damping out small variations in the data. For sufficiently short data segments, this approach provides optimum use of the survey platform by allowing close adherence to the specified percent coverage. However, segments which are too short can result in frequent changes of survey vessel heading, which may pose a navigation safety problem.

This approach partitions the data into approximately equal size sets of points, generates a center-of-mass (COM), i.e., a spatial "average" of the (x, y) points in the partition, for each partition and uses the generated COM as a part of the next navigation path.

The definitions to be applied to the following discussion are as follows:

The minimum line segment length is an input corresponding to the data segment length discussed above.

The total distance traversed is the summation of the point-to-point distances from one survey boundary to the other along the appropriate swath edge, which is defined by:

$$\text{total distance traversed} = \sum_{i=0}^{N-1} \text{distance}(i, i+1) \quad (15)$$

The data set must be partitioned into p approximately equal size "chunks." The number of partitions for a data set is given by:

$$\text{number of partitions} = \frac{\text{total distance traversed}}{\text{minimum line segment length}} \quad (16)$$

The number of points in each partition must also be calculated, and is defined by:

$$\text{points per partition} = \frac{N}{\text{number of partitions}} \quad (17)$$

A parametric first-order center-of-mass of a set of (x, y) data for on partition is given by:

$$\bar{x} = 1/n \sum_{i=1}^{n} x(i) \quad (18)$$

where n=number of points in the partition $$\bar{y} = 1/n \sum_{i=1}^{n} y(i)$$

By iterating over the partitions, a set of way points are obtained that partially define the next navigation path. The reason that these points only partially define the next navigation path is that the set of way points lie totally within the survey bounds, with the first and last COM approximately one-half of the distance across one partition from the survey bounds.

The way points for the ends of the next navigation path must be defined to complete the navigation path. PLR is used to generate the starting and finishing way points on the new navigation path from the first and last COM to the respective survey boundaries. PLR is used to calculate the slopes of the lines fitting the data in approximately half of the first and last portions (the "half" between the appropriate COM and the survey bounds), and these slopes are used to extend the navigation path to the survey boundaries from the first and last COM points. This approximates a "tethered" linear regression fit to this portion of the data. The purpose of using this approach instead of just extending the line defined by the first two and last COM points to the survey bounds is to more accurately model swath data that is radically changing toward one or both ends of the current navigation path.

After the new navigation path is determined, each end point of the path is extended beyond the survey bounds and then the resultant line is clipped at the survey bounds to ensure that the final navigation path's endpoints lie upon the survey bounds. The algorithm for calculating the intersection point of two lines is accomplished in a manner known in the art.

The error of the fit to the data for this algorithm is determined by calculating the DISTRMSE for each line segment defined by the way points in the next navigation path and summing them.

first StartPoint=(pointsPerPartition−1)/2
Last StartPoint=firstStartPoint+((numPartitions−1)*piontsPerPartition
The pseudo-code for calculating the total error is:
total error=0
for i=0 to numNavPathPoints−1 do
   line.start=navPathPoints[i]
   line.end=navPathPoint[i+1]
   if first line segment then
     calculate DISTRSME for points 0 to firstStartPoint−1 using line
     add to total error
   else if last line segment then
     calculate DISTRSME for points lastStartPoint to numPoints using line
     add to total error
   else
     calculate DISTRSME for points i*pointsPerPartition to (i+1)*pointsPerPartition using line
     add to total error
   end if
end for
return total error The points output from any SL, PLR, or PCOM are (x, y) coordinates and do not contain all of the information required by the automatic steering system. Thus, these points are used as input to an algorithm that generates the actual way points that the automatic steering system uses. This algorithm generates way points at a user=specified interval, which defaults to 100 m. The automatic steering system then dynamically steers the vessel over the desired path by using course-to-steer to the vessel's autopilot.

Steering in this manner allows for the possibility of a more advanced steering algorithm that interprets various system inputs to dynamically adapt to environmental changes. bottom topology, etc.

The RMSE can also be used to execute a tiered approach to the type of line fit used, as shown on FIG. 6. With a tiered approach, the line fit process would start with the SL algorithm for every line. If the RMSE is too great, indicating possible gaps or excessive overlap, then the PLR and PCOM algorithms would, in turn, be attempted until a satisfactory error is obtained.

As previously stated, the edge used to generate the next navigation path is chosen by keeping the data points from the edges which lies within the current survey bounds. This requires that a new survey bounds be generated for each new navigation path, so that the appropriate edge can be chosen in the next iteration. An overview of this algorithm is shown in FIG. 10.

Figure 10:
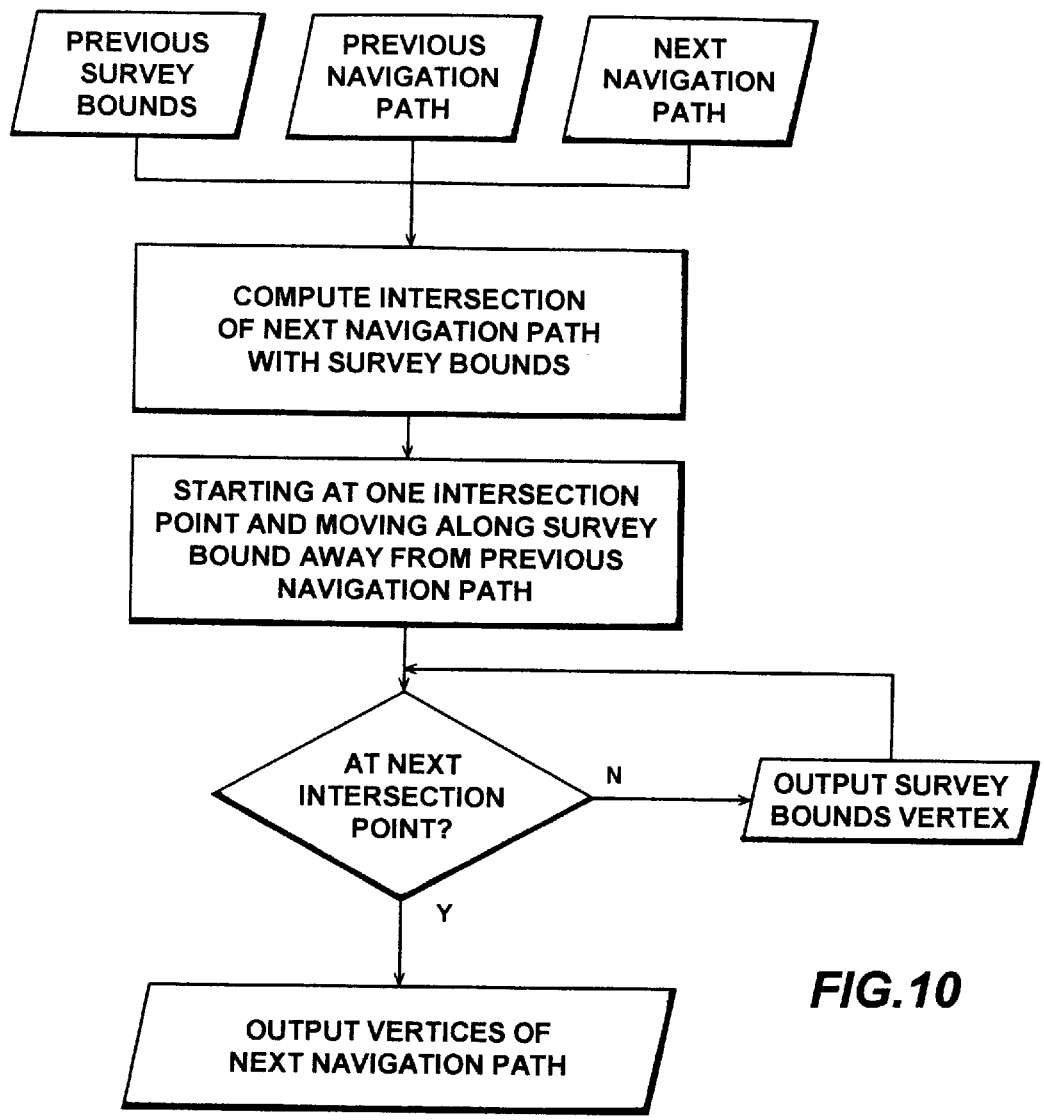
FIG. 10 shows the relationship of survey bounds, previous navigation path, and next navigation path.
Figure 11:
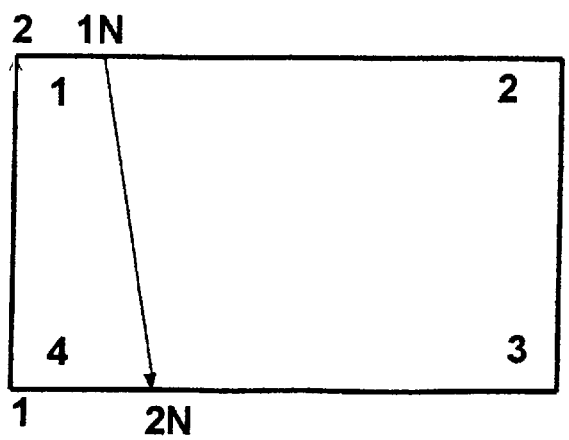
FIG. 11 shows a flow chart of the new survey bounds process.

In order to understand the process of generating a new survey bounds, as shown in FIG. 10, the relationships between the previous navigation path, the previous survey bounds, the next navigation path, and the new survey bounds must be understood. The survey bounds, previous navigation path, and next navigation path relationships are demonstrated in FIG. 11. The line 1→2 represents the previous navigation path, the labeling within the box from 1 to 4 represents the previous survey bounds, the line 1N→2N represents the next navigation path, and the interior labeling within the box 2N, 3, 2, 1N represents the new survey bounds.

The algorithm uses the fact that the previous navigation path lies along one (SL or PLR), or multiple (PCOM), edges of the current survey bounds. The algorithm is further based upon the fact that the next navigation path will divide the survey bounds into a "surveyed area" and an "unsurveyed area."

From one of the intersection points (2N) of the next navigation path with the current survey bounds, the algorithm outputs the intersection vertex (2N) and outputs the vertices of the survey bounds moving away from the previous navigation path (away from the "unsurveyed area", e.g., 3, 2). Once the next intersection point with the survey bounds is encountered (1N), the outputting of survey bounds vertices is stopped. The next navigation path's vertices (except the last one, which is output initially) are then output (1N), ensuring that the new survey bounds will have the new navigation path as one (SL or PLR) or more (PCOM) of its edges.

This iterative method of generating new survey bounds "contains" the next navigation path as one or more of its (contiguous) edges.

An end-game problem occurs when the automated survey works itself into a corner of the survey area. This can result in a sequence of short survey lines, where more time is spent in the vessel turns than on the survey line, and may also result in a small gapped area at the end of the survey.

Another potential end-game problem occurs when the data curves "out" due to bottom morphology and the next navigation path generation method is PCOM. This may leave two "corners" (of course, under certain conditions, there could be more than two unsurveyed areas partitioned by the edge of the data and survey bounds) that need surveying to ensure complete coverage of the survey area.

In both cases it is recommended that the operator manually complete the survey. However, an algorithm can be defined to optimally cover the remaining areas.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A system for swath surveying that provides a variable swath to automatically accommodate for variable survey environmental conditions, comprising:

means for establishing an outer perimeter of an area to be surveyed;

means for establishing a first survey track of a plurality of survey tracks;

means for establishing a survey vehicle's terrestrial position;

means for piloting the survey vehicle on said first survey track;

means for acquiring swath data along a survey track;

means for determining swath data quality and rejecting data that does not meet specified constraints;

means for terminating the survey if no swath data is collected;

means for storing and displaying swath survey data, survey track, survey perimeter and, in real time, vehicle's terrestrial position data;

means for analytic determination of a second and subsequent survey tracks by using the swath data collected from a previous track to adapt said second and subsequent survey tracks to the variable current environmental conditions of the survey;

means for piloting the survey vehicle on the second and subsequent survey tracks;

means for terminating the survey upon completion of said second and subsequent survey tracks; and means for displaying the survey results.

2. A system, as in claim 1, wherein the means for establishing an outer perimeter of an area to be surveyed is accomplished by specifying a polygon that bounds a desired survey area, based on predetermined survey requirements.

3. A system, as in claim 2, wherein the polygon is specified by denoting the coordinates of the polygon's vertices.

4. A system, as in claim 3, wherein the polygon, if not convex, is subdivided into a set of convex polygons to determine the specific area to be surveyed.

5. A system, as in claim 2, wherein the means for establishing a first survey track of a plurality of survey tracks is determined by selecting one of the sides of the specified polygon and defining a direction of travel.

6. A system, as in claim 1, wherein the means for positioning the survey vehicle is an electronic navigation system.

7. A system, as in claim 6, wherein the electronic navigation system is a global positioning system (GPS) satellite grouping.

8. A system, as in claim 6, wherein the electronic navigation system is an inertial navigation system.

9. A system, as in claim 1, wherein the means for piloting the survey vehicle on the first survey track is an autopilot.

10. A system, as in claim 1, wherein the means for piloting the survey vehicle on the first survey track is a manual pilot.

11. A system, as in claim 1, wherein the means for acquiring swath data within the survey perimeter along said first survey track is a swath survey system.

12. A system, as in claim 11, wherein the swath survey system is a swath laser ranging system.

13. A system, as in claim 11, wherein the swath survey system is a swath sonar system.

14. A system, as in claim 11, wherein the swath survey system is a swath radar ranging system.

15. A system, as in claim 1, wherein the means for determining swath data quality and rejecting data that does not meet specified constraints is a computer system for electronic evaluation using predetermined parameters.

16. A system, as in claim 1, wherein the means for storing and displaying swath data, survey track, survey perimeter and, in real time, vehicle's terrestrial position is a computer system.

17. A system, as in claim 1, wherein the means for analytic determination of a second and subsequent survey tracks by using swath data collected from a previous track to adapt automatically to variable current environmental conditions of the survey is a computer system.

18. A system, as in claim 1, wherein the means for piloting the survey vehicle on a second and subsequent survey tracks is an autopilot.

19. A system, as in claim 1, wherein the means for piloting the survey vehicle on a second and subsequent survey tracks is a manual pilot.

20. A system, as in claim 1, wherein the means for terminating the survey when if no new swath data is collected within the survey perimeter is a computer.

21. A system, as in claim 1, wherein the means for displaying the survey data is a computer monitor.

22. A system, as in claim 1, wherein the means for displaying the survey data is an x-y plotter.

23. A computer system for analytic determination of a second and subsequent survey tracks of a plurality of survey tracks by using swath data collected from a previous track to provide a variable swath to automatically accommodate for variable survey environmental conditions, comprising:

a computer for computing,
- (a) a shift factor based upon a predetermined percent coverage of swath data within a predetermined survey area;
- (b) an initialization of a survey boundary to be a survey perimeter;
- (c) determining swath edge data points furthest away from a survey vehicles position on both sides of the swath, using data collected from a previous track;
- (d) applying a specific shift factor to the swath edge data points to determine shifted edge swath data points;
- (e) crop the shifted edge data points using the survey boundary to determine only those shifted data points that lie within the survey boundary;
- (f) if no swath data points have been collected within the survey boundary, terminate the survey;
- (g) determine if an end game condition exists, if end game conditions exist execute end game processing to generate next survey track;
- (h) determine next survey track that will follow a general trend of the shifted edge data points while smoothing short-term transients;
- (i) determine a new survey boundary by using the next survey track as the new boundary edge; and
- (j) repeat (c) through (i) until no new swath data is collected within the survey boundary, thereby terminating the survey; and
- (k) display the survey results on a display.

24. A swath surveying that provides a variable swath to automatically accommodate for variable survey environmental conditions comprising the steps of:

establishing an outer perimeter of an area to be surveyed;

establishing a first survey track of a plurality of survey tracks;

establishing a survey vehicle's terrestrial position;

piloting the survey vehicle on said first survey track;

acquiring swath data along a survey track;

determining swath data quality and rejecting data that does not meet specified constraints;

terminating the survey if no swath data is collected;

storing and displaying swath survey data, survey track, survey perimeter and, in real time, vehicle's terrestrial position data;

determining analytically a second and subsequent survey tracks by using the swath data collected from a previous track to adapt said second and subsequent survey tracks to the current variable environmental conditions;

piloting the survey vehicle on the second and subsequent survey tracks;

terminating the survey upon completion of said second and subsequent survey tracks; and displaying the survey results on a display.

25. A method for analytic determination of a second and subsequent survey tracks of a plurality of survey tracks by using swath data collected from a previous track to provide a variable swath to automatically accommodate for variable survey environmental conditions, comprising the steps of:

- (a) determining a shift factor based upon a predetermined percent coverage of swath data within a predetermined survey area;
- (b) initializing a survey boundary to be a survey perimeter;
- (c) determining swath edge data points furthest away from a survey vehicles position on both sides of the swath, using data collected from a previous track;
- (d) applying a specific shift factor to the swath edge data points to determine shifted edge swath data points;
- (e) cropping the shifted edge data points using the survey boundary to determine only those shifted data points that lie within the survey boundary;
- (f) terminating the survey if no swath data points have been collected within the survey boundary;
- (g) determining if an end game condition exists, if end game conditions exist execute end game processing to generate next survey track;
- (h) determining next survey track that will follow a general trend of the shifted edge data points while smoothing short-term transients;
- (i) determining a new survey boundary by using the next survey track as the new boundary edge;
- (j) repeating (c) through (i) until no new swath data is collected within the survey boundary, thereby terminating the survey; and
- (k) displaying the survey results on a display.

26. The system according to claim 1 wherein said means for analytic determination of said second and subsequent survey tracks comprises means for performing a center-of-mass technique for determining the second and subsequent survey tracks.

27. The system according to claim 24 wherein said determining of said second and subsequent survey tracks comprises performing a center-of-mass technique for determining the second and subsequent survey tracks.

* * * * *

UNITED STATES PATENT AND TRADEMARK OFFICE
CERTIFICATE OF CORRECTION

PATENT NO.    : 6,338,023 B1
DATED         : January 8, 2002
INVENTOR(S)   : Bourgeois et al.

It is certified that error appears in the above-identified patent and that said Letters Patent is hereby corrected as shown below:

<u>Title page,</u>
Item [73], should read:
-- [73]   Assignee:   The United States of America as represented by the Secretary of the Navy, Washington, DC (US) --

Signed and Sealed this

Thirtieth Day of March, 2004

JON W. DUDAS
*Acting Director of the United States Patent and Trademark Office*